US011862870B1

(12) United States Patent
Kaddour et al.

(10) Patent No.: US 11,862,870 B1
(45) Date of Patent: Jan. 2, 2024

(54) ARRAYS WITH THREE-DIMENSIONAL CONFORMAL RADIATING ELEMENTS

(71) Applicants: Abdul-Sattar Kaddour, Miami, FL (US); Stavros Georgakopoulos, Miami, FL (US)

(72) Inventors: Abdul-Sattar Kaddour, Miami, FL (US); Stavros Georgakopoulos, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/063,942

(22) Filed: Dec. 9, 2022

(51) Int. Cl.
*H01Q 5/48* (2015.01)
*H01Q 15/04* (2006.01)

(52) U.S. Cl.
CPC ............... *H01Q 5/48* (2015.01); *H01Q 15/04* (2013.01)

(58) Field of Classification Search
CPC ............ H01Q 5/48; H01Q 9/28; H01Q 15/04; H01Q 21/26
See application file for complete search history.

(56) References Cited

U.S. PATENT DOCUMENTS

| | | | | |
|---|---|---|---|---|
| 5,650,788 A * | 7/1997 | Jha | H01Q 21/065 343/702 |
| 2010/0220031 A1* | 9/2010 | Li | H01Q 9/0485 343/860 |
| 2020/0274255 A1* | 8/2020 | Krupa | H01Q 9/26 |

* cited by examiner

*Primary Examiner* — Ricardo I Magallanes
*Assistant Examiner* — Amal Patel
(74) *Attorney, Agent, or Firm* — Saliwanchik, Lloyd & Eisenschenk

(57) ABSTRACT

Antenna arrays with three-dimensional (3D) conformal radiating elements are provided, as well as methods of manufacturing and methods of using the same. An array can include a ground plane and a plurality of unit cells disposed thereon. Each unit cell can include a 3D conformal radiating element. The 3D conformal radiating elements can be, for example, patches (e.g., circular 3D patches), dipoles, or loops, and each radiating element is conformal on a hemispherical shape.

8 Claims, 16 Drawing Sheets

Replacement Sheet

| Beam Direction (°) | Feed offset (°) | Parallel dipoles  | | | Curved Patch  | | | |
|---|---|---|---|---|---|---|---|---|
| | | Phase range >360° | | | Phase range 314° | | | |
| | | Gain (dBi) | η (%) | SLL (dB) | Gain (dBi) | η (%) | SLL (dB) | Surface reduction factor |
| 0 | 0 | 31.6 | 64.25 | 20.4 | 31.7 (+0.1) | 65.7 (+1.4) | 20.5 (+0.1) | 1.02 |
| 0 | 20 | 31.2 | 58.6 | 23.6 | 31.4 (+0.2) | 61.36 (+2.7) | 24 (+0.4) | 1.04 |
| 10 | | 31.4 | 61.36 | 22.7 | 31.5 (+0.1) | 62.8 (+1.4) | 19 (-3.7) | 1.02 |
| 20 | | 31.1 | 58.6 | 23.6 | 31.3 (+0.2) | 60 (+2.4) | 18.3 (-5.6) | 1.02 |
| 30 | | 31 | 55.9 | 22.8 | 31.1 (+0.1) | 57 (+1.4) | 21.2 (-1.6) | 1.02 |
| 40 | | 30 | 44.5 | 20.8 | 30.6 (+0.6) | 51 (+6.5) | 20.16 (-0.64) | 1.14 |
| 50 | | 24.8 | 13.4 | 11.5 | 29.7 (+4.9) | 41.5 (+28.1) | 21.17 (+9.67) | 3.1 |
| 60 | | 25.35 | 15.23 | 12.9 | 28.4 (+3) | 30.7 (+15.47) | 21.7 (+8.8) | 2 |
| 70 | | 24.6 | 12.82 | 5.3 | 23.8 (-0.8) | 10.6 (-2.2) | 13.6 (+8.3) | 0.82 |

ARRAYS WITH THREE-DIMENSIONAL CONFORMAL RADIATING ELEMENTS

GOVERNMENT SUPPORT

This invention was made with government support under FA9550-19-1-0290 awarded by the Air Force Office of Scientific Research (AFOSR). The government has certain rights in the invention.

BACKGROUND

The rise of 5G and the need for mobile coverage in narrow streets (e.g., old city centers) presents challenges for architects, construction firms, mobile operators, and especially antenna manufacturers. Current high gain antennas such as reflectarrays and transmitarrays have a limited beamwidth covering range up to 45° for a (maximum) 3 decibel (dB) gain drop from the broadside. This limitation is due to the radiation element radiating properties (directive) and the fundamentals of array antennas (gain drops as a factor of cos(θ) from the broadside).

BRIEF SUMMARY

Embodiments of the subject invention provide novel and advantageous antenna arrays (e.g., reflectarrays, transmitarrays, and phased arrays) with three-dimensional (3D) conformal radiating elements, as well as methods of manufacturing and methods of using the same. An array can include a ground plane and a plurality of unit cells disposed thereon. Each unit cell can include a 3D conformal radiating element. The 3D conformal radiating elements can be, for example, patches (e.g., circular 3D patches), dipoles, or loops, but each radiating element must be conformal on a hemispherical shape. Each radiating element can comprise any suitable conductive material (e.g., copper, silver, aluminum, steel, copper paint, conductive polylactic acid (PLA), or conductive filament). Each unit cell can include a substrate (which can be an electrically insulating substrate, such as a plastic material) on which the conformal radiating elements is disposed, though such a substrate is not required. Each unit cell can be disposed directly adjacent to at least one other unit cell (i.e., in direct physical contact with at least one other unit cell, with no elements disposed therebetween).

In an embodiment, an antenna array can comprise: a ground plane; and a plurality of unit cells disposed on the ground plane, each unit cell comprising a 3D conformal radiating element comprising a conductive material, the 3D conformal radiating element of each unit cell being conformal on a hemispherical shape. The antenna array can be a phased array, a reflectarray, or a transmitarray. The 3D conformal radiating element can be or comprise, for example: a conformal circular patch; a circular mushroom shape with a plurality of cutout portions (e.g., a plurality of cutout portions spaced equidistantly from each other circumferentially around the circular mushroom shape); a plurality of conformal curved parallel dipoles; or a central conductive portion and a plurality of dipole arms each connected to the central conductive portion (e.g., via a switch, such that if the switch connecting a dipole arm to the central conductive portion via a switch is on, that dipole arm is active, and if the switch connecting a dipole arm to the central conductive portion via a switch is off, that dipole arm is not active). Each unit cell can further comprise an electrically insulating substrate disposed on the ground plane and on which the 3D conformal radiating element is disposed. The substrate of each unit cell can be in direct physical contact with the ground plane and/or with the 3D conformal radiating element of the respective unit cell. Each unit cell can have a maximum height, measured in a direction perpendicular to the ground plane, of 20 millimeters (mm), 10 mm, 5 mm, 4 mm, 3 mm, or 2 mm. The antenna array can have a maximum height or thickness, measured in the direction perpendicular to the ground plane, of 20 mm, 10 mm, 5 mm, 4 mm, 3 mm, or 2 mm. The antenna array can have a beamwidth coverage of at least 60° with a gain beamwidth drop from the broadside of no more than 3 decibels (dB). The antenna array can have a reflection phase range of at least 300°.

In another embodiment, a method of fabricating an antenna array as disclosed herein can comprise: using a 3D printer to print the ground plane and the 3D conformal radiating element of each unit cell with a polymer; and metallizing the ground plane and the 3D conformal radiating element of each unit cell with a conductive metal. The antenna array can be a reflectarray or a transmitarray. The antenna array can be a phased array, a reflectarray, or a transmitarray. The polymer can be a thermoplastic, an amorphous polymer, or both. Each unit cell can have a maximum height, measured in a direction perpendicular to the ground plane, of 20 mm, 10 mm, 5 mm, 4 mm, 3 mm, or 2 mm. The antenna array can have a maximum height or thickness, measured in the direction perpendicular to the ground plane, of 20 mm, 10 mm, 5 mm, 4 mm, 3 mm, or 2 mm. The 3D conformal radiating element can be or comprise, for example: a conformal circular patch; a circular mushroom shape with a plurality of cutout portions (e.g., a plurality of cutout portions spaced equidistantly from each other circumferentially around the circular mushroom shape); a plurality of conformal curved parallel dipoles; or a central conductive portion and a plurality of dipole arms each connected to the central conductive portion (e.g., via a switch, such that if the switch connecting a dipole arm to the central conductive portion via a switch is on, that dipole arm is active, and if the switch connecting a dipole arm to the central conductive portion via a switch is off, that dipole arm is not active). The method can further comprise forming (e.g., with the polymer), on each unit cell, an electrically insulating substrate on the ground plane and on which the 3D conformal radiating element is disposed. The substrate of each unit cell can be formed to be in direct physical contact with the ground plane and/or with the 3D conformal radiating element of the respective unit cell. The antenna array can have a beamwidth coverage of at least 60° with a gain beamwidth drop from the broadside of no more than 3 dB. The antenna array can have a reflection phase range of at least 300°.

BRIEF DESCRIPTION OF DRAWINGS

FIG. 18 shows a 4×3 reflectarray, this is for exemplary purposes and should not be construed as limiting.

DETAILED DESCRIPTION

Embodiments of the subject invention provide novel and advantageous antenna arrays (e.g., reflectarrays, transmitarrays, and phased arrays) with three-dimensional (3D) conformal radiating elements, as well as methods of manufacturing and methods of using the same. An array can include a ground plane and a plurality of unit cells disposed thereon. Each unit cell can include a 3D conformal radiating element. The 3D conformal radiating elements can be, for example, patches (e.g., circular 3D patches), dipoles, or loops, but each radiating element must be conformal on a hemispherical shape. Each radiating element can comprise any suitable conductive material (e.g., copper, silver, aluminum, steel, copper paint, conductive polylactic acid (PLA), or conductive filament). Each unit cell can include a substrate (which can be an electrically insulating substrate, such as a plastic material) on which the conformal radiating elements is disposed, though such a substrate is not required. Each unit cell can be disposed directly adjacent to at least one other unit cell (i.e., in direct physical contact with at least one other unit cell, with no elements disposed therebetween).

Figure 1A:
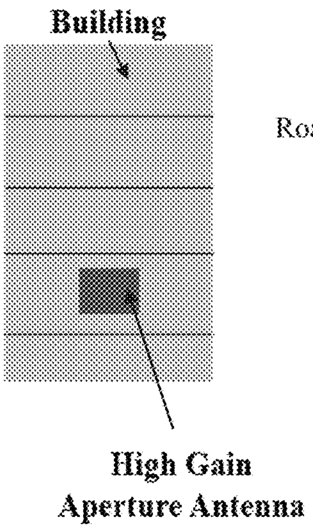
FIG. 1A shows a side view of a building with a high aperture antenna disposed on the side thereof.
Figure 1B:
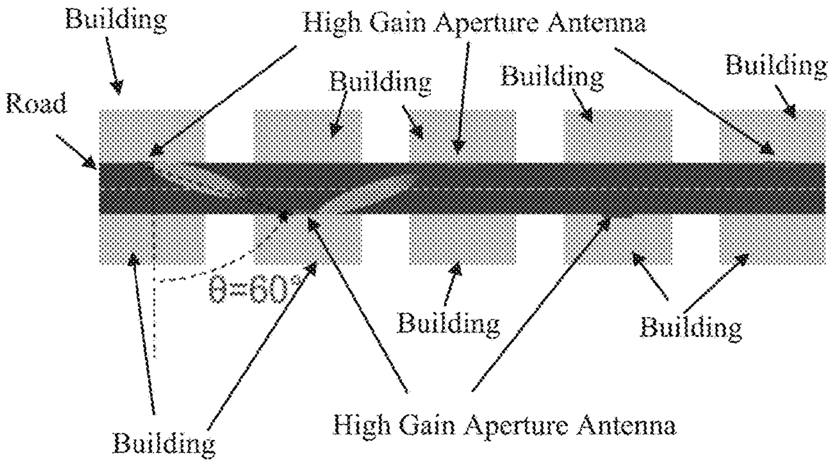
FIG. 1B shows an overhead view of buildings along a road, some of the buildings having high aperture antennas on respective sides thereof.

The need for mobile coverage in challenging locations (e.g., narrow streets) requires high gain aperture antennas with a wide beamwidth coverage (up to 60° beam direction), preferably with a flat (or substantially flat compared to the height of the building) aperture on buildings. FIG. 1A shows an antenna on the side of a building, and FIG. 1B shows an example of multiple antennas on buildings along a road, illustrating the need for up to 60° beam direction wide beamwidth coverage. Embodiments of the subject invention provide relatively flat (relative to the height of a building or streetlight post; e.g., thickness of no more than 50 millimeters (mm), or even no more than 40 mm, no more than 30 mm, no more than 20 mm, no more than 10 mm, no more than 5 mm, or no more than 3 mm) antenna arrays able to provide a beamwidth coverage of at least 60° while maintaining a small footprint (e.g., on buildings or streetlights). Increasing the beamwidth of the radiating elements of the array is a key enabler to enhance the performance of array antennas (e.g., reflectarray, transmitarray, phased array) when designed to have a beam directed toward steep angles (e.g., at least 60°).

Figure 2A:
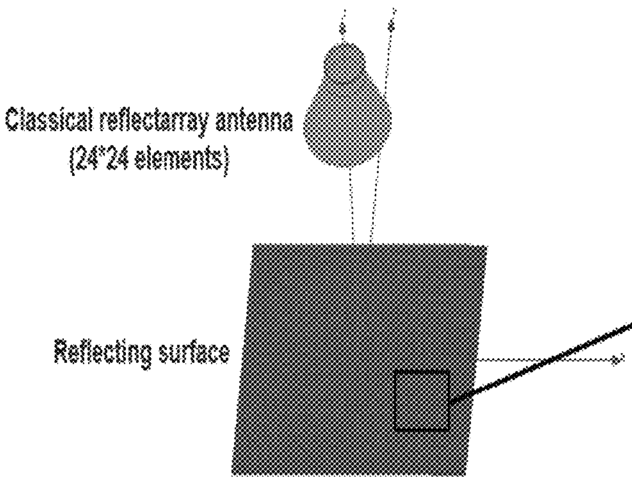
FIG. 2A shows a reflectarray antenna.
Figure 2B:
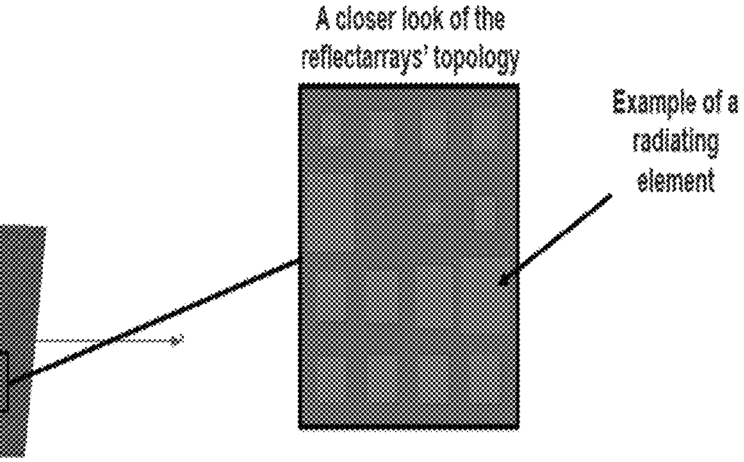
FIG. 2B shows an enlarged view of the section highlighted with the rectangle in FIG. 2A.

FIGS. 2A and 2B show a reflectarray, which is an antenna comprising a flat or slightly curved reflecting surface and an illuminating feed antenna. On the reflecting surface, there are many radiating elements, and the feed antenna spatially illuminates these reflectarray elements that are redesigned to reradiate and scatter the incident field with electrical phases that are required to form a planar phase front in the far—field distance. Different methods can be used for reflectarray elements to achieve a planar phase front. One such method is using variable size patches so that elements can have different scattering impedances and, thus, different phases to compensate for the different feed—path delays.

Figure 3B:
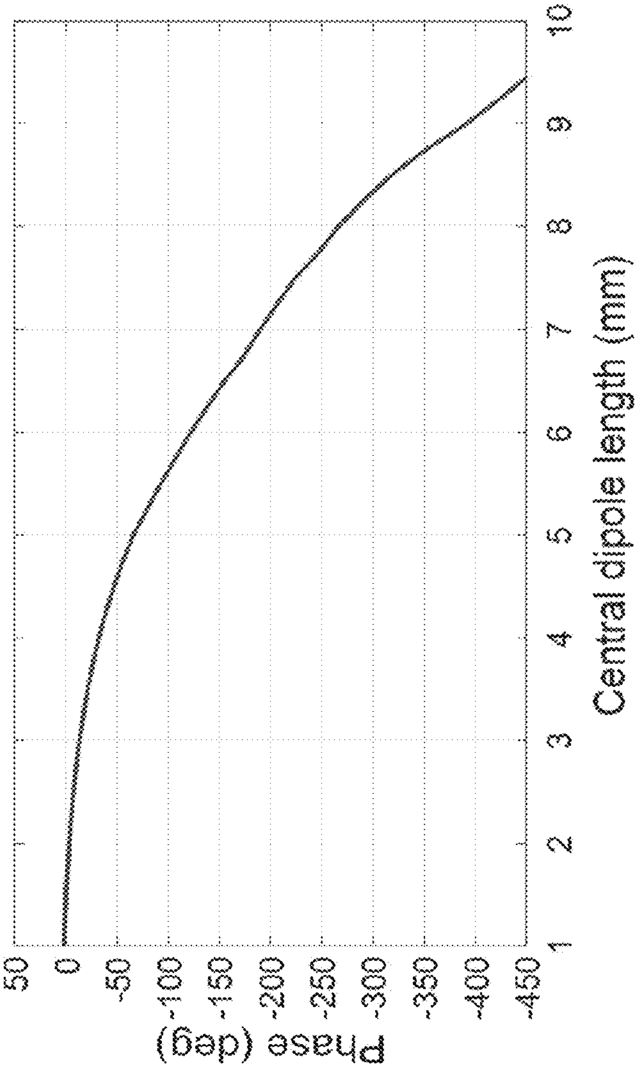
FIG. 3B shows a lot of phase (in degrees (deg)) versus central dipole length (in millimeters (mm)) for the unit cell shown in FIG. 3A.
Figure 3A:
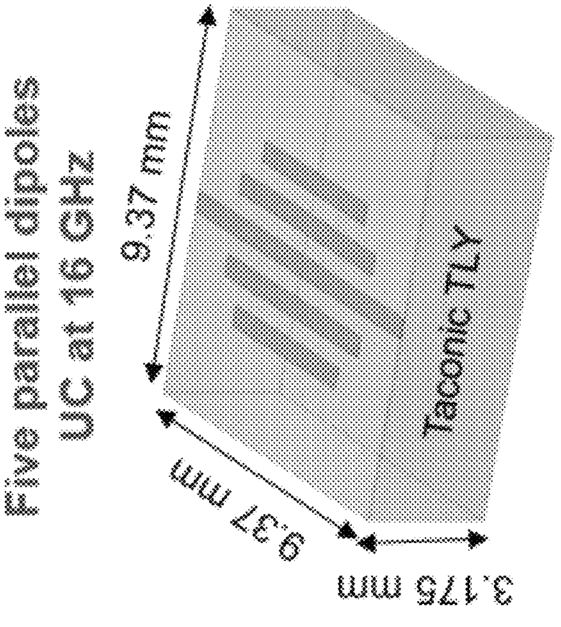
FIG. 3A shows a unit cell of a flat printed circuit board (PCB) reflectarray antenna made from unit cells each having five parallel dipoles.
Figure 4:
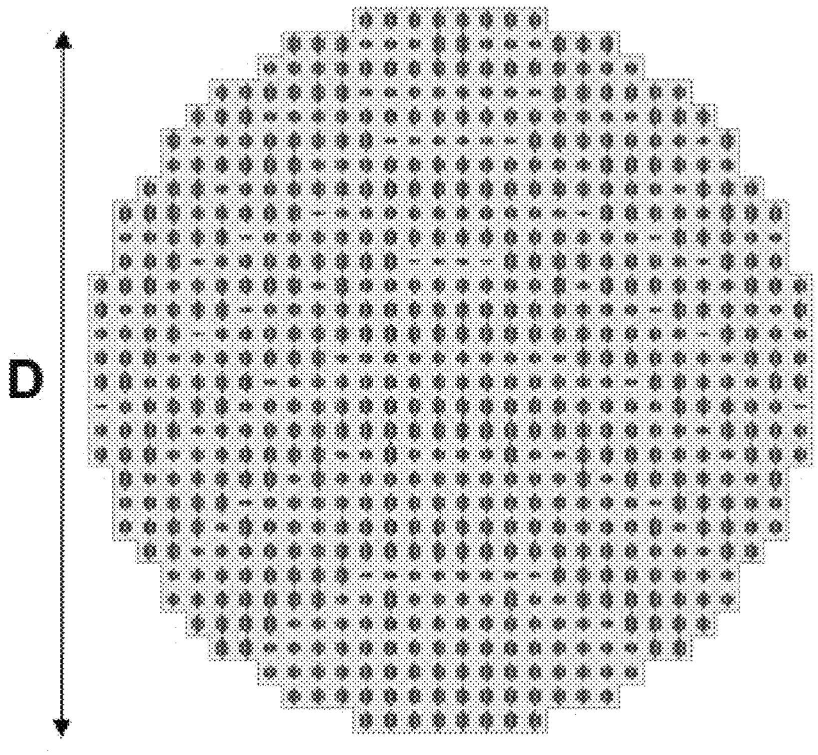
FIG. 4 shows an overhead view of a flat PCB reflectarray antenna made from unit cells where each unit cell is the unit cell from FIG. 3A. The reflectarray shows many unit cells.
Figure 5:
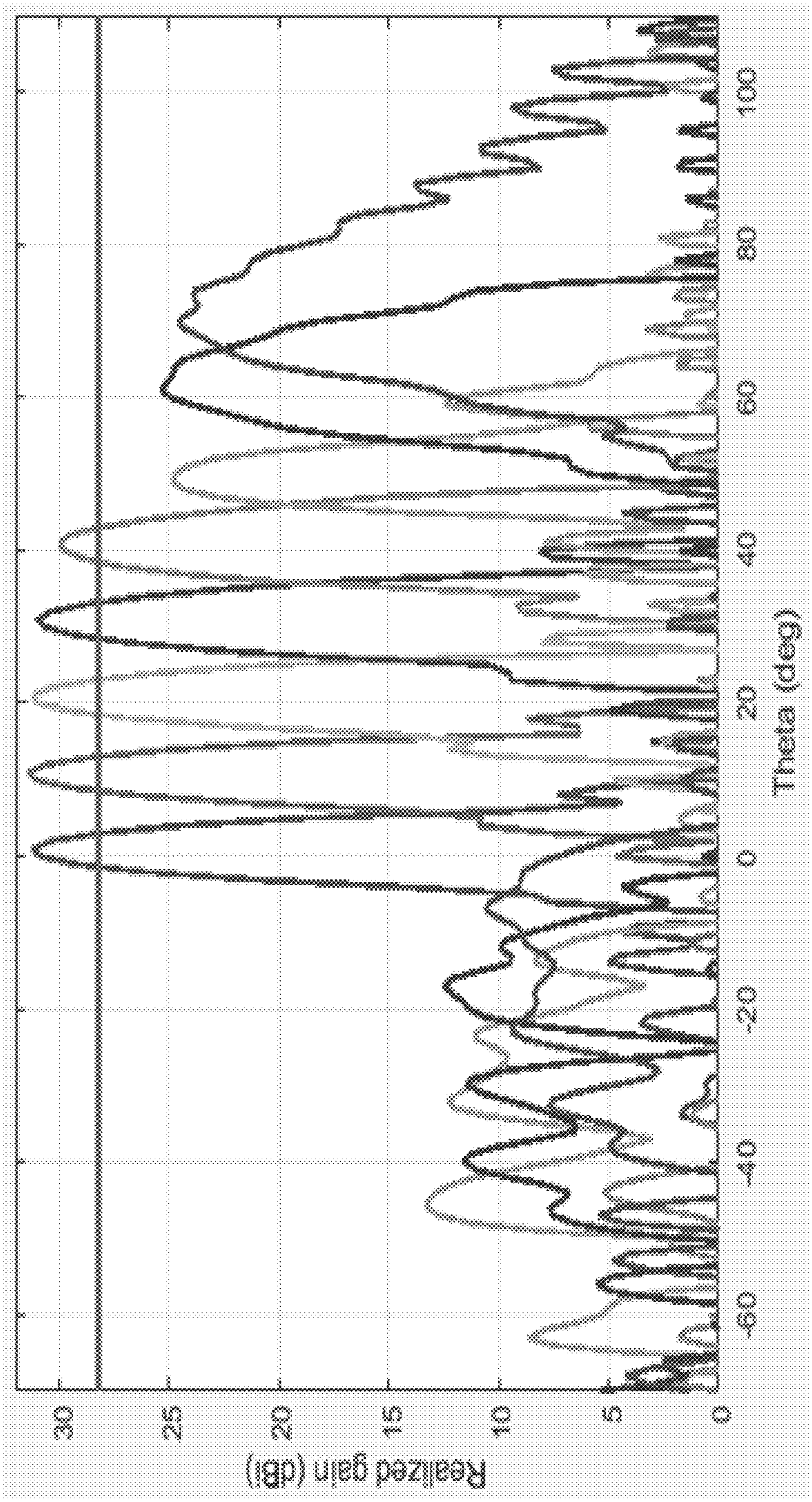
FIG. 5 shows a plot of realized gain (in decibels per isotropic (dBi)) versus theta (in deg) for the reflectarray shown in FIG. 4, with inter-element spacing of 0.5λ, aperture size (D) of 30λ, offset feed of 20°; and frequency of 16 gigahertz (GHz).

Classical flat printed circuit board (PCB) arrays have limited beamsteering performance of no more than 45° if a 3 decibel (dB) gain beamwidth from the broadside is considered. An efficient reflectarray antenna is one in which each unit cell comprises five parallel dipoles, as shown in FIG. 3A. Referring to FIG. 3B, this unit cell provides a linear reflection phase range up to 440°. Referring to FIGS. 4 and 5, the array has limited beamsteering performance up to 45° if a 3 dB gain beamwidth drop from the broadside is considered. Additionally, beyond 45°, the gain drops drastically with an increase of grating lobes and side lobes levels (SLLs).

Figure 6A:
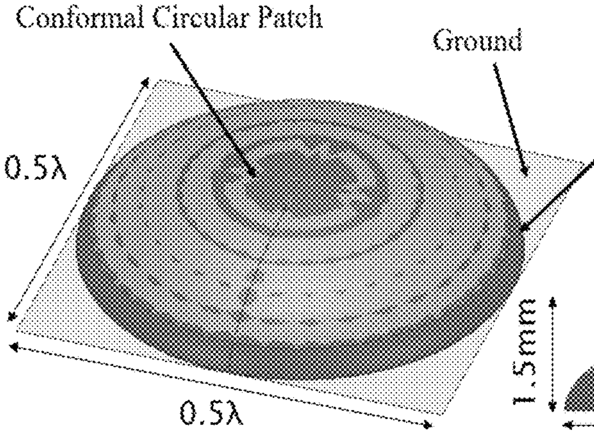
FIG. 6A shows a perspective view of a unit cell of an antenna array, the unit cell having a three-dimensional (3D) conformal patch radiating element, according to an embodiment of the subject invention. Though certain dimensions are shown in FIG. 6A, this is for exemplary purposes and should not be construed as limiting.
Figure 6B:
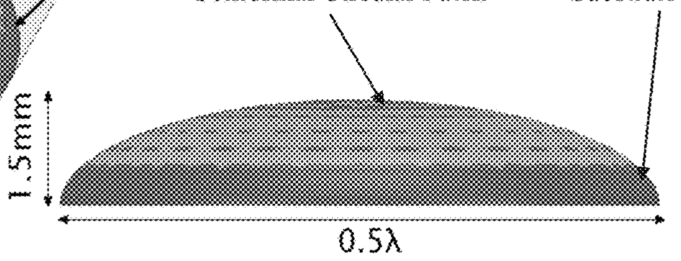
FIG. 6B shows a side view of the unit cell shown in FIG. 6A. Though certain dimensions are shown in FIG. 6B, this is for exemplary purposes and should not be construed as limiting.

FIGS. 6A and 6B show a perspective view and a side view, respectively, of a unit cell of an antenna array, the unit cell having a 3D conformal patch radiating element, according to an embodiment of the subject invention. Though certain dimensions are shown in FIGS. 6A and 6B, this is for exemplary purposes and should not be construed as limiting. Referring to FIGS. 6A and 6B, the unit cell can include a substrate disposed on a ground plane, and a 3D conformal patch (e.g., a 3D conformal circular patch) disposed on the substrate. The patch can comprise a conductive material, including but not limited to copper, silver, aluminum, steel, copper paint, conductive PLA, and/or conductive filament. The radius or greatest width of each unit cell can be, for example, 0.5 times the wavelength (λ) of the electromagnetic radiation applied to the unit cell. The maximum height of the unit cell, and therefore the thickness of the array, can be, for example, any of the following values, about any of the following values, at least any of the following values, not more than any of the following values, or within any range having any of the following values as endpoints (all numerical values are in mm): 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, 10, 15, 20, 30, 40, or 50. For example, the maximum height of the unit cell, and therefore the thickness of the array, can be 1.5 mm or about 1.5 mm.

Figure 7:
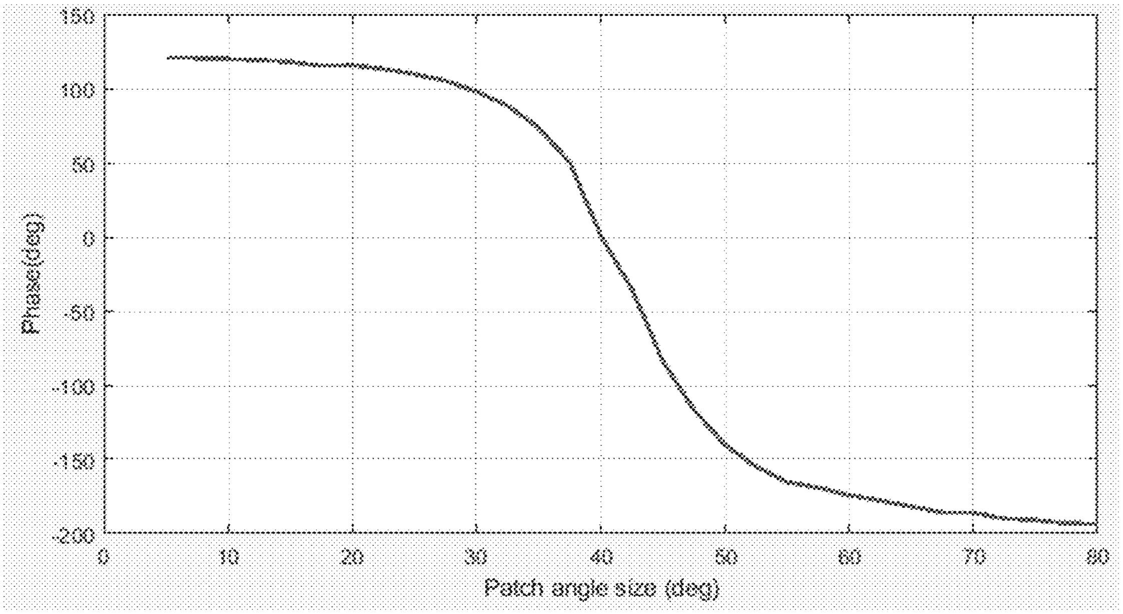
FIG. 7 shows a plot of phase (in deg) versus patch angle size (in deg) for the unit cell shown in FIGS. 6A and 6B.

FIG. 7 shows a plot of phase versus patch angle size for the unit cell shown in FIGS. 6A and 6B. Referring to FIG. 7, the unit cell can provide a reflection phase range up to 313°.

Embodiments of the subject invention can provide array (e.g., phased arrays, reflectarray, and/or transmitarray) unit cells with an increase of the beamwidth scanning to 60° (or even more) with a 3 dB gain drop (or less) from the broadside direction. This corresponds to at least an additional 15° over the reflectarray with unit cells having five parallel dipoles (beamwidth coverage of 45°). Thus, high gain antennas for steep beam directions can be designed and implemented to satisfy 5G/6G backhauling electromagnetic requirements while maintaining a small footprint and flat (e.g., thickness of no more than 50 mm, or in some cases no more than 40 mm, no more than 30 mm, no more than 20 mm, no more than 10 mm, no more than 5 mm, or no more than 3 mm).

Figure 8:
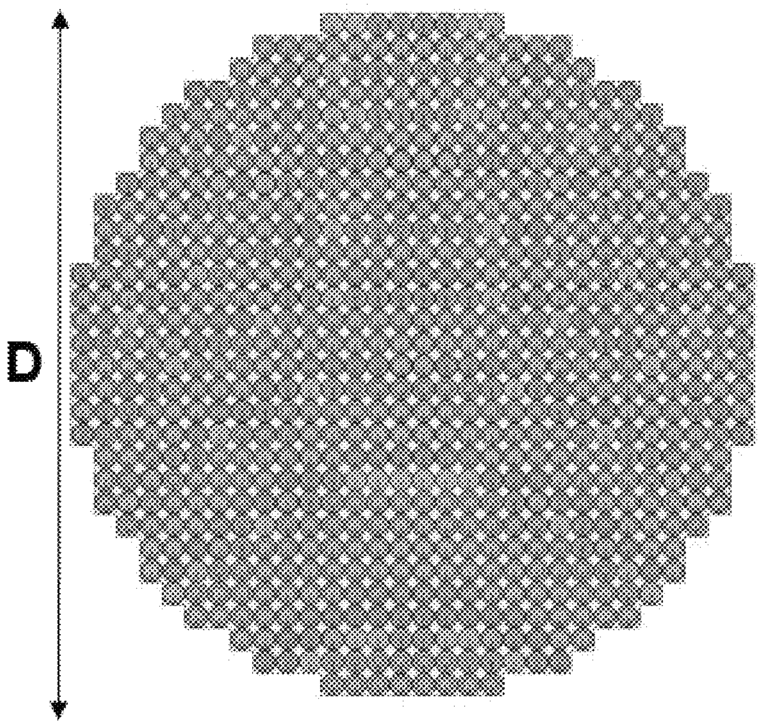
FIG. 8 shows an overhead view of a reflectarray antenna made from unit cells where each unit cell is the unit cell from FIGS. 6A and 6B. The reflectarray shows many unit cells.
Figure 9:
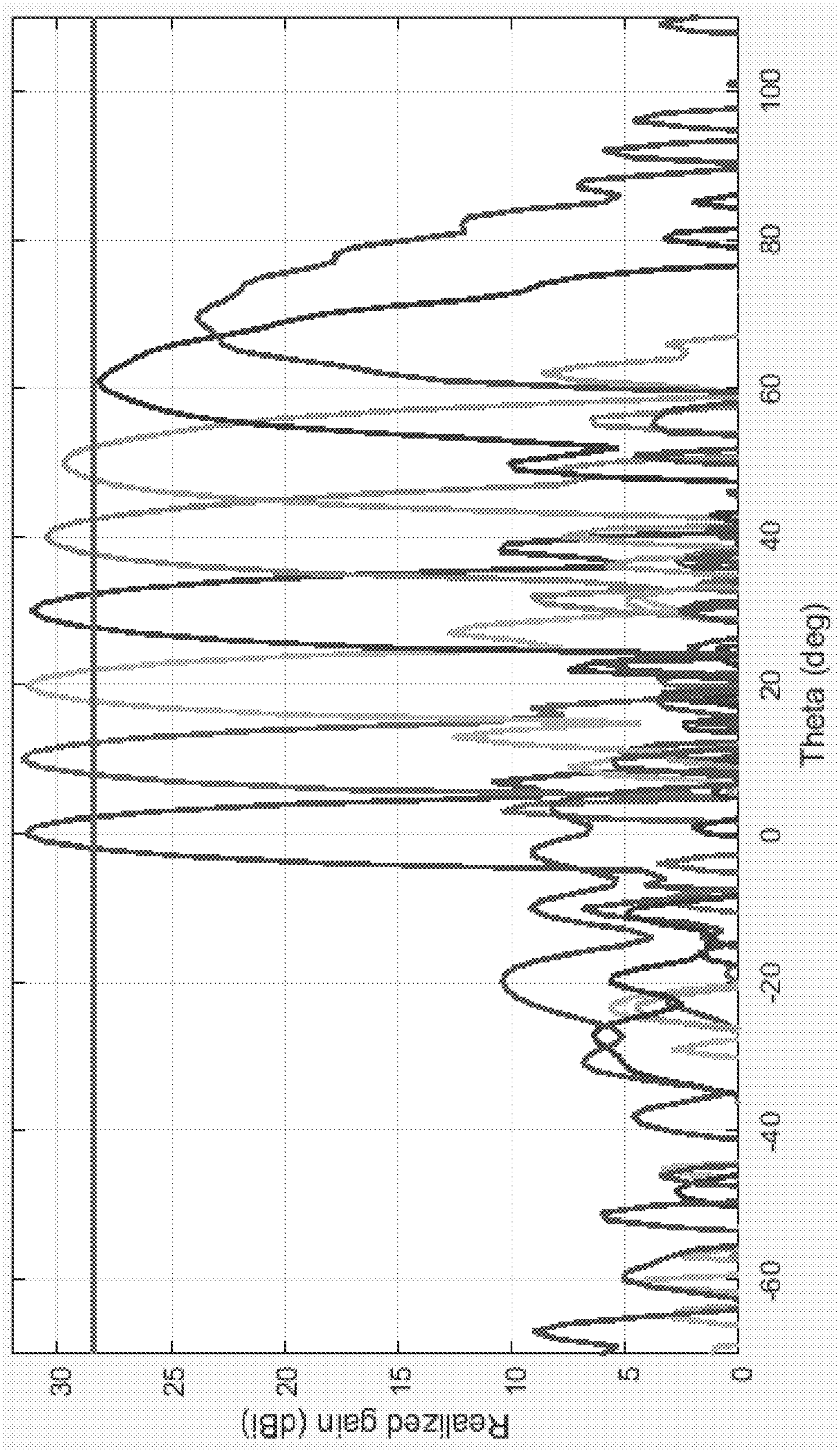
FIG. 9 shows a plot of realized gain (in dBi) versus theta (in deg) for the reflectarray shown in FIG. 8, with inter-element spacing of 0.5λ, aperture size (D) of 30λ, offset feed of 20'; and frequency of 16 GHz, where λ is the wavelength of the electromagnetic radiation applied to the array and/or unit cell.

FIG. 8 shows an overhead view of a reflectarray antenna made from unit cells where each unit cell is the unit cell from FIGS. 6A and 6B. The reflectarray shows many unit cells, where each small circular shape is the conformal patch radiating element of a unit cell. FIG. 9 shows a plot of realized gain versus theta for the reflectarray shown in FIG. 8, with inter-element spacing of 0.5λ, aperture size (D; see also dimension noted in FIG. 8) of 30λ, offset feed of 20°; and frequency of 16 gigahertz (GHz), where k is the wavelength of the electromagnetic radiation applied to the array and/or unit cell. Referring to FIG. 9, the 3D conformal patch radiating element has an enhanced beamsteering performance of at least 60° if a 3 dB gain beamwidth drop from the broadside is considered. Additionally, the grating lobes levels and SLLs are smaller compared to the five parallel dipoles reflectarray (see FIGS. 3A, 3B, 4, and 5).

In certain embodiments, the 3D conformal radiating element of each unit cell can be electrically connected with the 3D conformal radiating element of at least one adjacent unit cell of the array. In certain embodiments, the substrate of each unit cell can be in direct, physical contact with the substrate of at least one adjacent unit cell of the array. In certain embodiments, the 3D conformal radiating element of each unit cell can be in direct, physical contact with the 3D conformal radiating element of at least one adjacent unit cell of the array. In certain embodiments, the array can comprise a single, monolithic ground plane on which each unit cell is disposed.

Figure 10A:
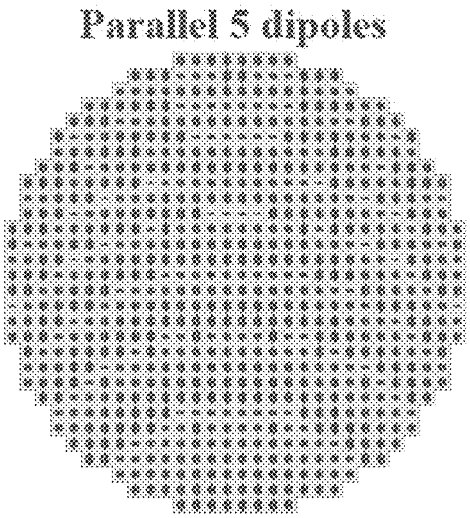
FIGS. 10A and 10B show, respectively: an overhead view of a flat PCB reflectarray antenna made from unit cells where each unit cell is the unit cell from FIG. 3A; and an overhead view of a reflectarray antenna made from unit cells where each unit cell is the unit cell from FIGS. 6A and 6B.
Figure 10B:
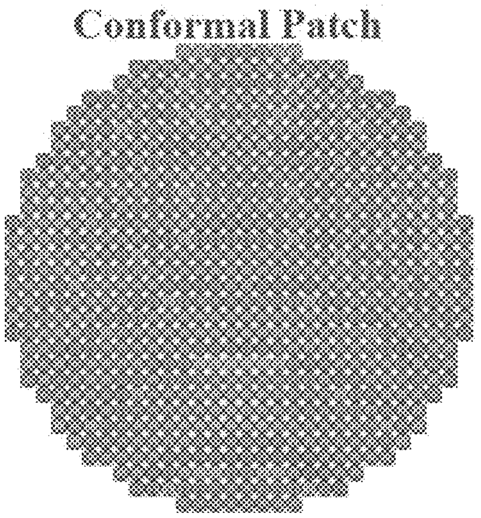
Figure 11:
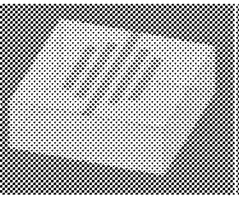
FIG. 11 shows a table comparing performance of the reflectarray of FIG. 10A (the columns labeled "parallel dipoles") and the reflectarray of FIG. 10B (the columns labeled "curved patch").
Figure 11:
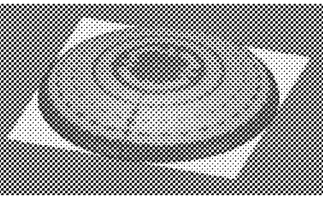

FIGS. 10A and 10B show, respectively, overhead views of a flat PCB reflectarray antenna (made from unit cells where each unit cell is the unit cell from FIG. 3A) and a reflectarray antenna made from unit cells where each unit cell is the unit cell from FIGS. 6A and 6B. The table in FIG. 11 shows a comparison in performance of the reflectarray of FIG. 10A (the columns labeled "parallel dipoles") and the reflectarray of FIG. 10B (the columns labeled "curved patch"; a reflectarray according to an embodiment of the subject invention). Referring to FIG. 11, the 3D conformal patch radiating element has an enhanced beamsteering performance of at least 60° if a 3 dB gain beamwidth drop from the broadside is considered. Specifically, between 40° and 60° beam angles, the 3D conformal patch radiating element reflectarray provides a higher gain while the grating lobes levels and SLLs are smaller compared to the five parallel dipoles reflectarray. Further the 3D conformal patch radiating element array can achieve the same gain as classical planar reflectarrays while using an aperture that is three times smaller or two times smaller if the desired beam direction is at 50° or 60°, respectively.

Though a unit cell with a 3D conformal patch (e.g., a 3D conformal circular patch) is discussed in detail herein, embodiments are not limited thereto. Any type of radiating element can be used, such as dipoles and/or loops. The only requirement is that the radiating element must be 3D and must be conformal on a hemispherical shape. The array can be made by, for example, printing it (e.g., 3D printing) with a polymer (e.g., a plastic such as a thermoplastic and/or amorphous polymer such as acrylonitrile butadiene styrene (ABS)) or a similar material (which can serve as the substrate). The array can then be metallized with one or more metals as the conductive material for the radiating elements.

Figure 12A:
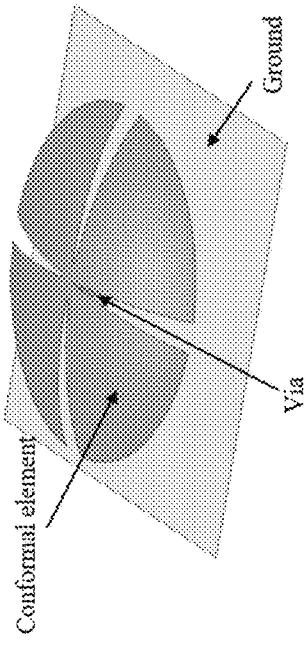
FIG. 12A shows a perspective view of a unit cell of an antenna array, the unit cell having a 3D conformal radiating element, according to an embodiment of the subject invention.
Figure 12B:
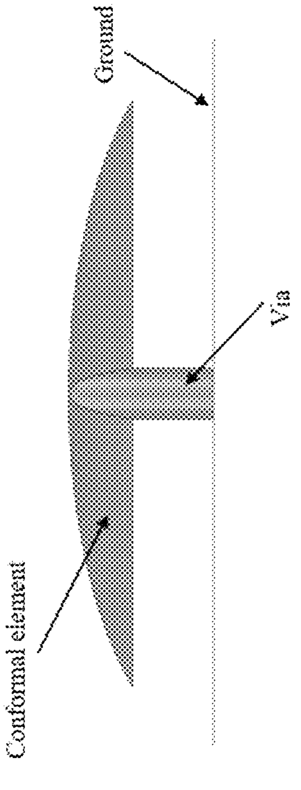
FIG. 12B shows a side view of the unit cell shown in FIG. 12A.
Figure 12C:
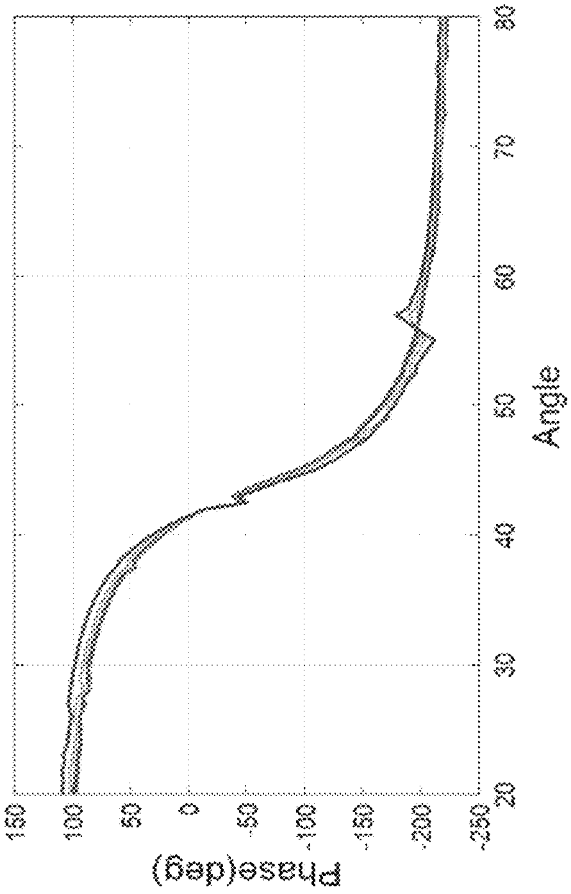
FIG. 12C shows a plot of phase (in deg) versus angle size (in deg) for the unit cell shown in FIGS. 12A and 12B.

FIGS. 12A and 12B show a perspective view and a side view, respectively, of a unit cell of an antenna array, the unit cell having a 3D conformal radiating element, according to an embodiment of the subject invention. FIG. 12 C shows a plot of phase versus angle size for the unit cell shown in FIGS. 12A and 12B. Referring to FIGS. 12A and 12B, the conformal element can have portions cut out or missing (e.g., four cut-out portions spaced equidistantly from each other circumferentially around the conformal element). The portion labeled "via" in FIGS. 12A and 12B can be part of the radiating element (i.e., formed of a conductive material, which can be the same or different from that of the "conformal element"), or it can a substrate. That is, the substrate can be omitted, with the "via" being in direct physical contact with the ground plane.

Figure 13:
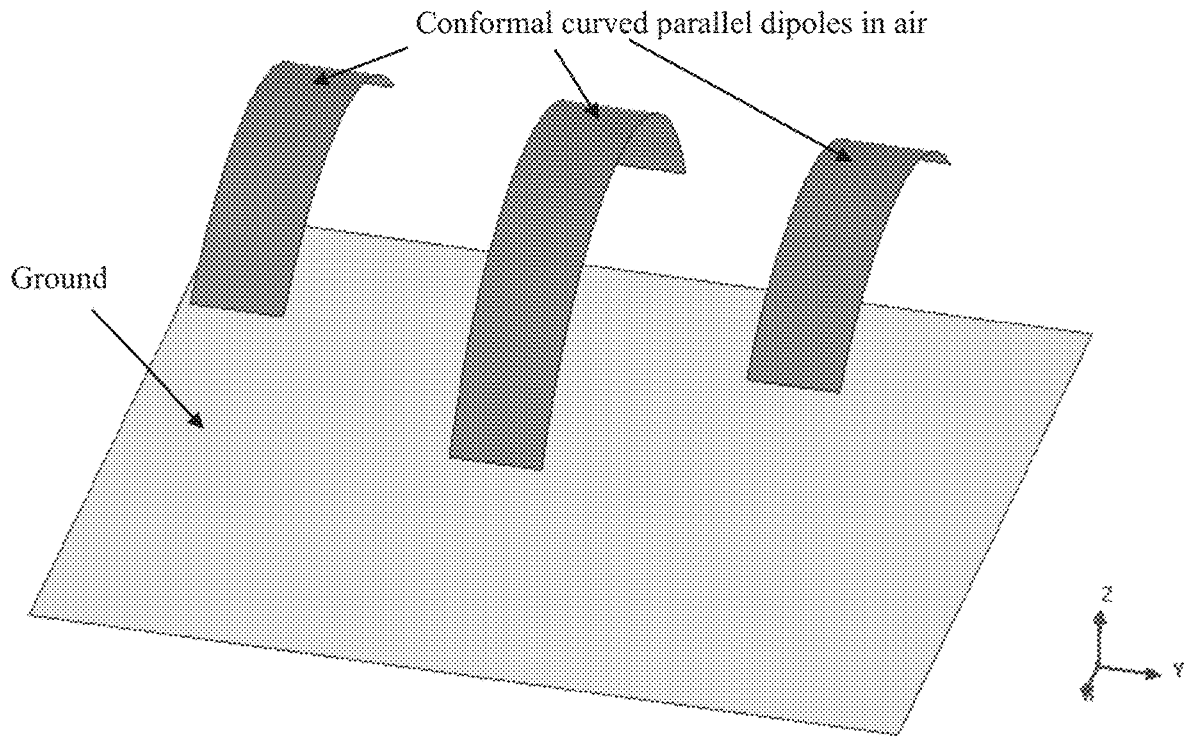
FIG. 13 shows a perspective view of a unit cell of an antenna array, the unit cell having 3D conformal radiating elements, according to an embodiment of the subject invention. The unit cell in FIG. 13 has curved parallel dipoles in air. Although three curved parallel dipoles are depicted in FIG. 13, this is for exemplary purposes and should not be construed as limiting.
Figure 14:
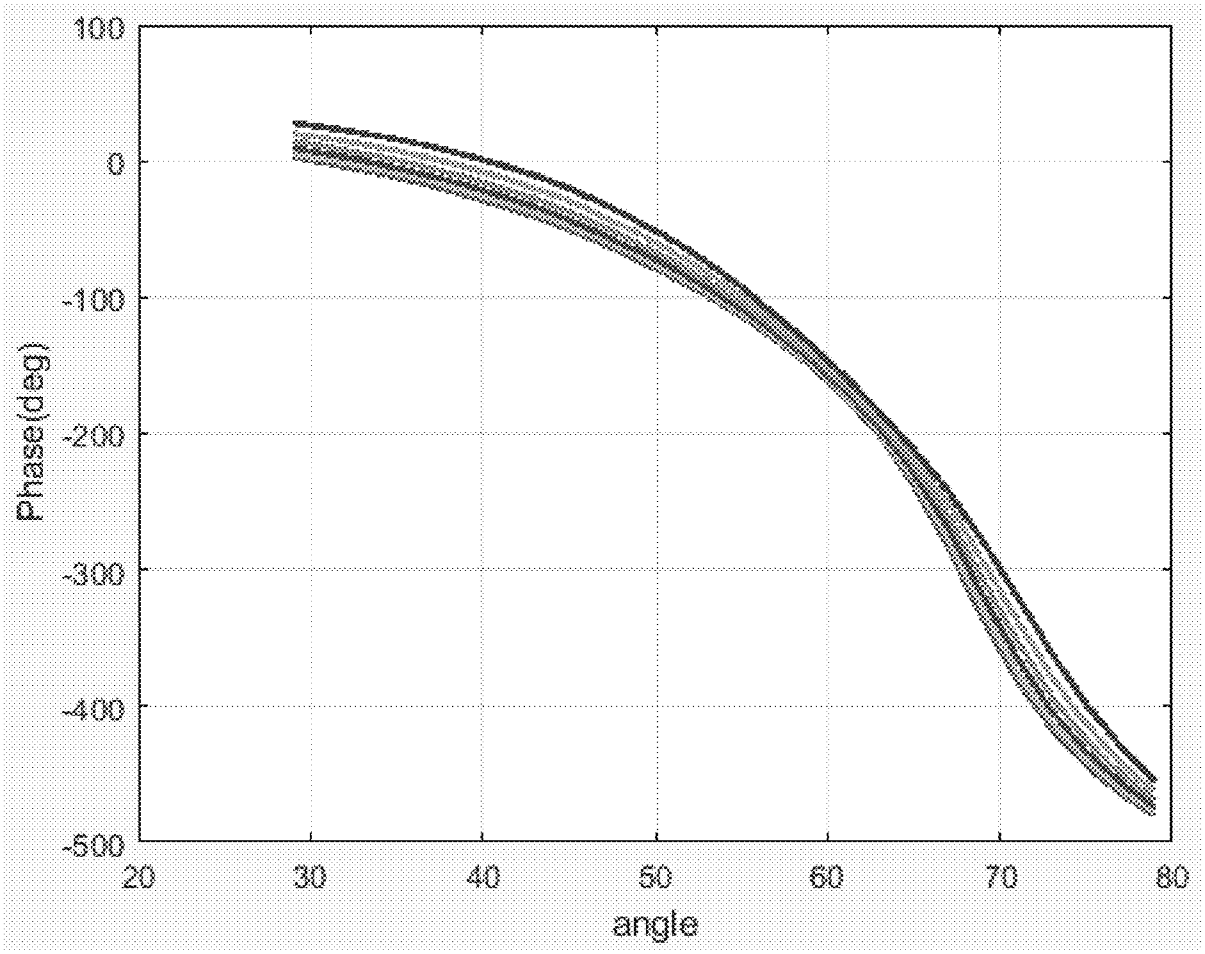
FIG. 14 shows a plot of phase (in deg) versus angle size (in deg) for the unit cell shown in FIG. 13.

FIG. 13 shows a perspective view of a unit cell of an antenna array, the unit cell having 3D conformal radiating elements, according to an embodiment of the subject invention. The unit cell in FIG. 13 has curved parallel dipoles in air. Although three curved parallel dipoles are depicted in FIG. 13, this is for exemplary purposes and should not be construed as limiting. FIG. 14 shows a plot of phase versus angle size for the unit cell shown in FIG. 13. Referring to FIG. 13, the curved dipoles can be disposed in a staggered manner such that the base portion in direct physical contact with the ground plane are not all aligned with each other in a lateral direction parallel to the upper surface of the ground plane (e.g., in the example in FIG. 13, the leftmost and rightmost dipoles have their base portions are aligned, or disposed along the same imaginary line in the lateral direction, while the base portion of the middle dipole is not aligned, such that it is not disposed along the same imaginary line in the lateral direction with the base portions of the other two dipoles).

Figures 15A, 15B, 15C, 15D:
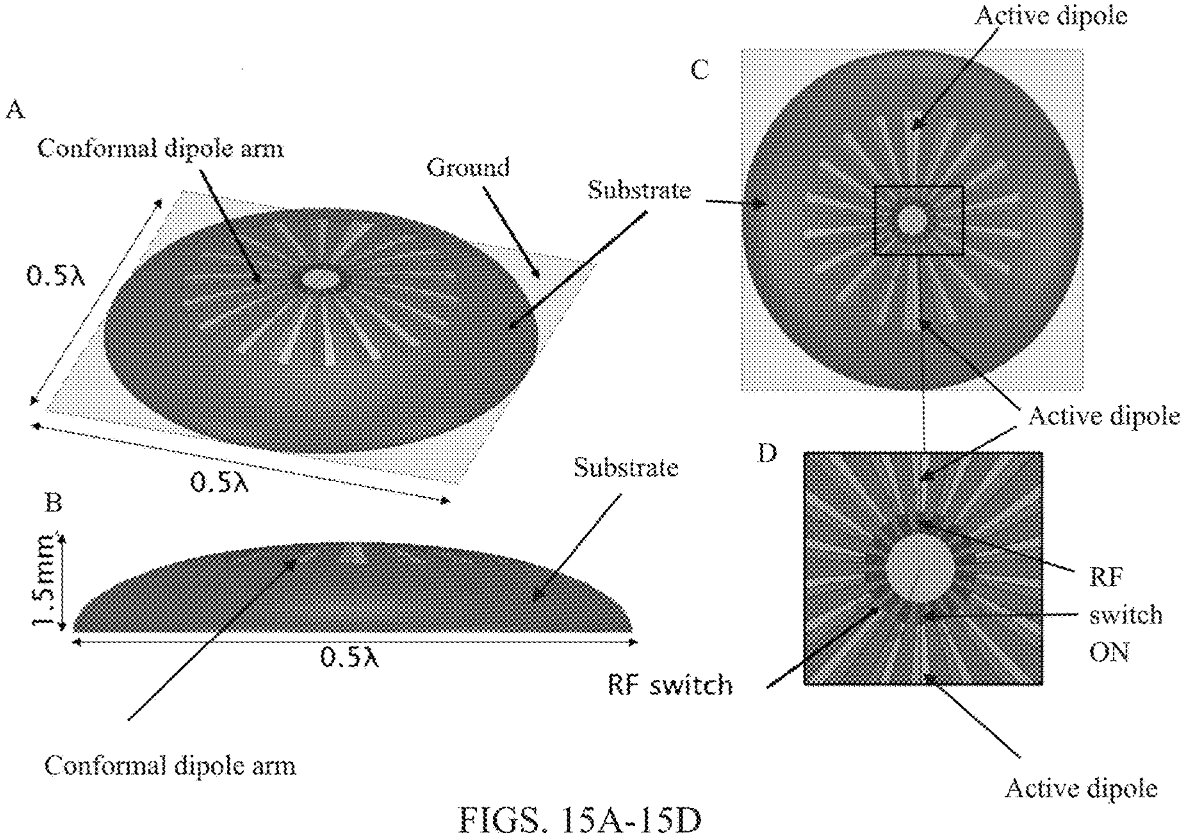
FIG. 15A shows a perspective view of a unit cell of an antenna array, the unit cell having active conformal radiating elements, according to an embodiment of the subject invention. The unit cell in FIG. 15A has conformal dipole arms, each having a radio frequency (RF) switch connected thereto. Though certain dimensions are shown in FIG. 15A, this is for exemplary purposes and should not be construed as limiting.
FIG. 15B shows a side view of the unit cell shown in FIG. 15A. Though certain dimensions are shown in FIG. 15B, this is for exemplary purposes and should not be construed as limiting.
FIG. 15C shows a top view of the unit cell shown in FIG. 15A. The active dipoles are labeled, and all unlabeled dipoles are passive (i.e., not active).
FIG. 15D shows an enlarged view of the section highlighted with the rectangle in FIG. 15C. The active dipoles are labeled, and all unlabeled dipoles are passive. The active dipoles are active because their RF switches are switched ON, and the passive dipoles are passive because their RF switches are switched OFF.
Figure 16:
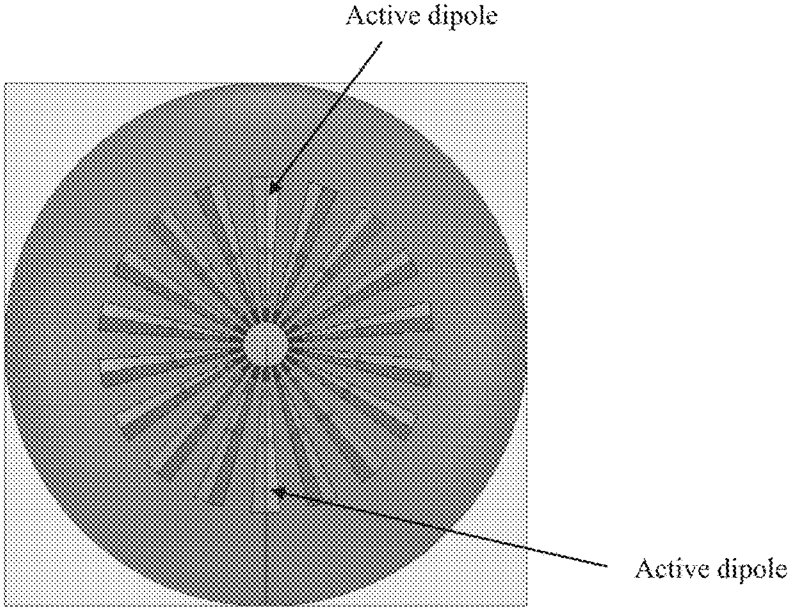
FIG. 16 shows a top view of the unit cell shown in FIGS. 15A-15C.

In an embodiment, an active array (e.g., active reflectarray) can dynamically steer its beam. FIGS. 15A-15D and 16 show an example of a unit cell of such an array. Referring to FIGS. 15A-15D and 16, a plurality of conformal dipole arms can be disposed on a substrate, which can be disposed on a ground plane. Each dipole arm can be connected to an electrically conductive center section via a respective switch (e.g., radio frequency (RF) switch) that can be switched on or off. When the switch is on for a particular dipole arm, that dipole arm is active, and when the switch is off for a particular dipole arm, that dipole arm is passive (i.e., not active). A given state of the unit cell can include, for example two diametrically opposed dipole arms being active while the remaining dipole arms are passive, as depicted in FIGS. 15C, 15D, and 16. The example depicted in FIGS. 15A-15D and 16 shows eighteen dipole arms (nine diametrically opposed pairs), and this is for exemplary purposes only; any suitable number of dipole arms could be used, and each diametrically opposed dipole pair can provide a different state.

Figure 17:
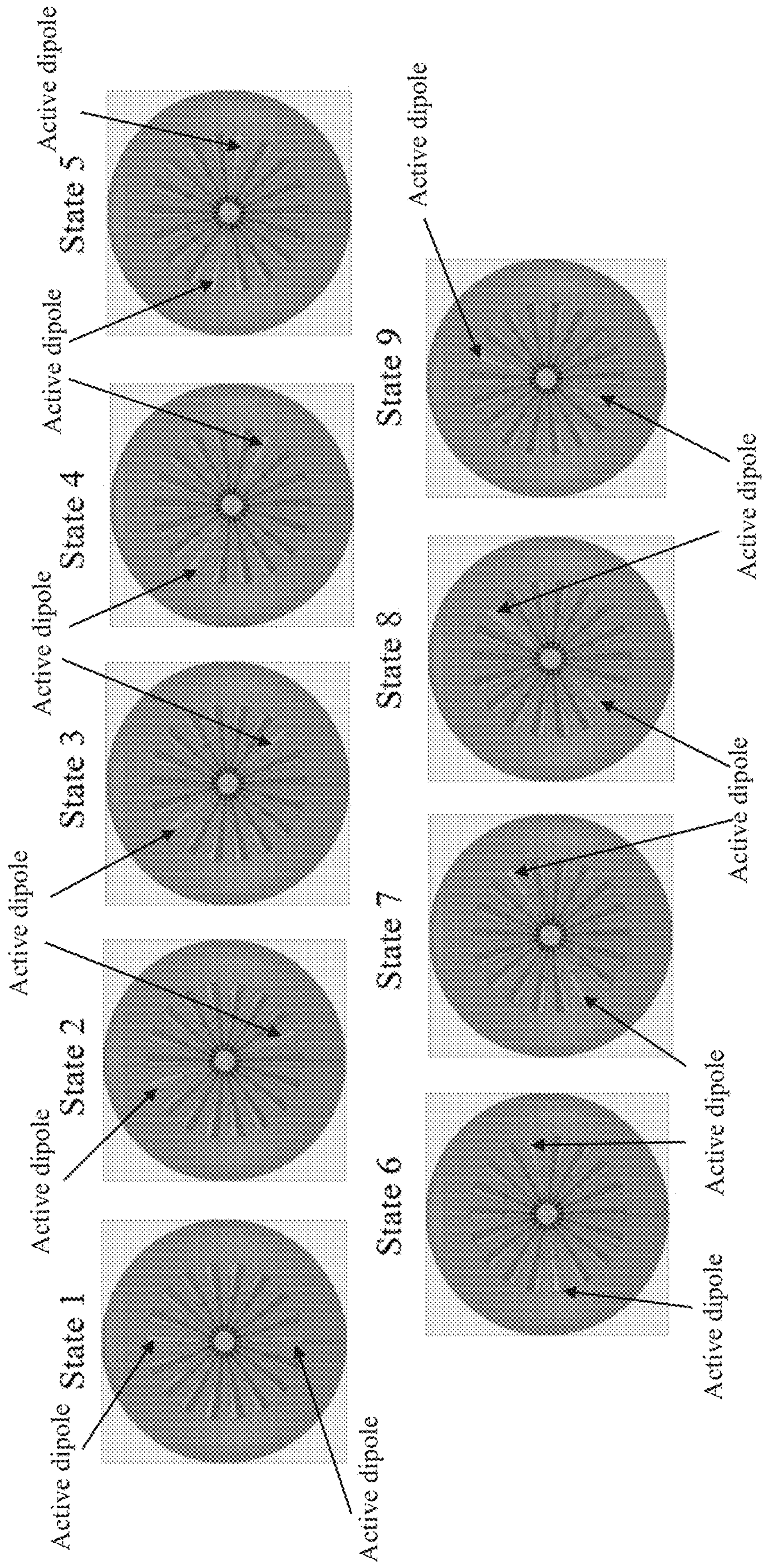
FIG. 17 shows top views of the unit cell shown in FIGS. 15A-15C, in nine different states based on which dipoles are active. In each state, the active dipoles are labeled, and all unlabeled dipoles are passive.

FIG. 17 shows top views of the unit cell shown in FIGS. 15A-15C, in nine different states based on which dipoles are active. In each state, the active dipoles are labeled, and all unlabeled dipoles are passive. Also, as seen in FIG. 17, in each state a diametrically opposed dipole pair (or linear dipole pair) is active. The different states (e.g., nine states) of phase for beamsteering reflectarray applications can be achieved by integrating switches (e.g., RF switches) in a rotation-invariant geometry, so that selectively actuating some of the lumped elements implements the "electromagnetic rotation" of the element. Eighteen RF switches are present on the unit cell in the example depicted in FIGS. 15-17 (two RF switches for each linear dipole or a set of a reflection phase) to achieve nine operation states. The unit cell has nine dipoles, the arms of each dipole being connected to its linear dipole (or diametrically opposed dipole) using two switches. Depending on the state of the switch, the dipole arm is either active (switch is on) or passive (switch is off).

Figure 18:
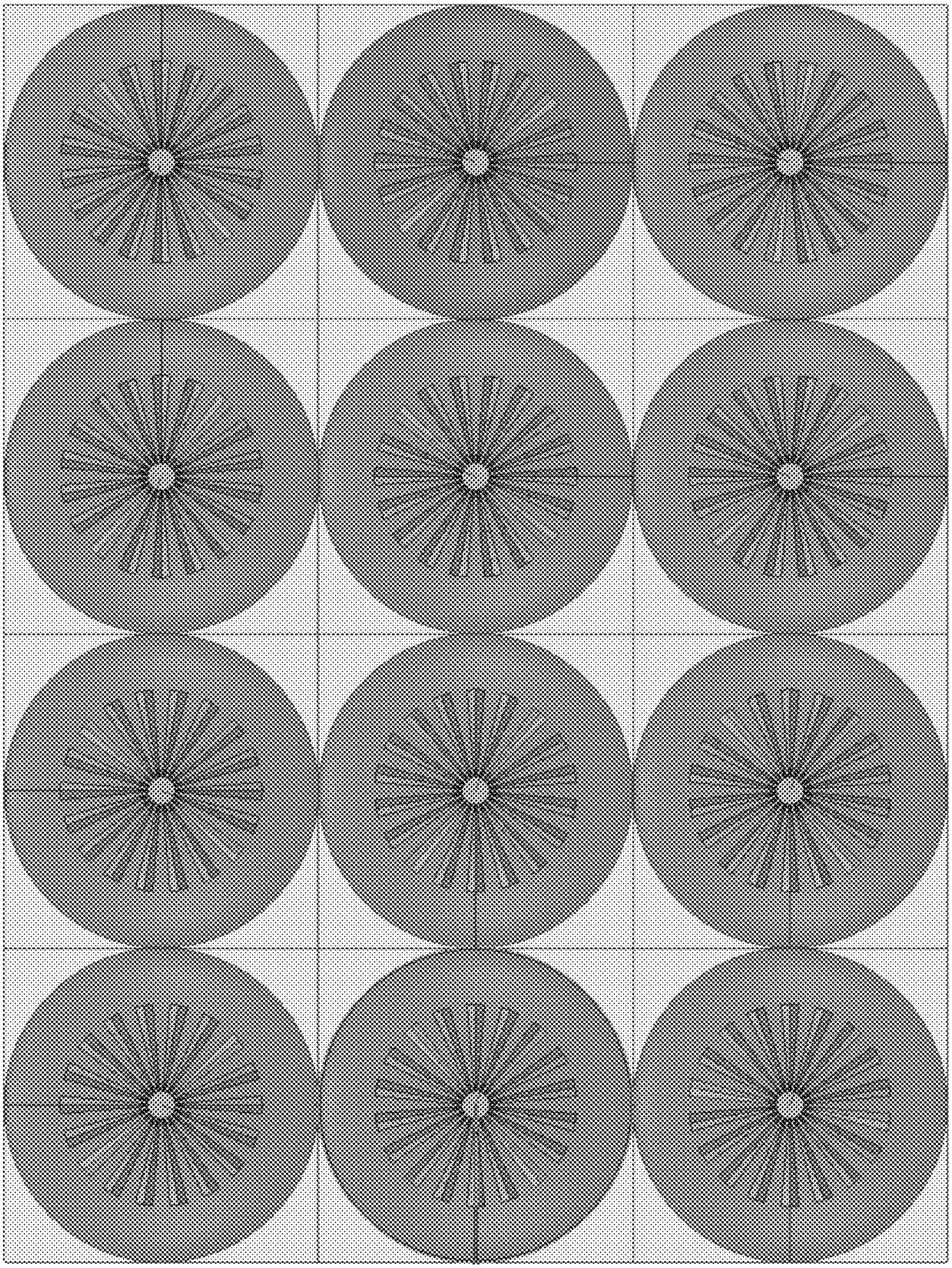
FIG. 18 shows a top view of a reflectarray, each unit cell of which is the unit cell shown in FIGS. 15A-15C. Each unit cell can have any pair of dipoles active according to the needs of the user. The active dipoles can be changed when needed/desired using the RF switches within each respective unit cell. Though

FIG. 18 shows a top view of a reflectarray, each unit cell of which is the unit cell shown in FIGS. 15A-15C. Each unit cell can have any pair of dipoles active according to the needs of the user. The active dipoles can be changed when needed/desired using the RF switches within each respective unit cell. Though FIG. 18 shows a 4×3 reflectarray, this is for exemplary purposes and should not be construed as limiting. Each unit cell can have the same dipole pair active as every other unit cell; or the unit cells can have different dipole pairs active at any given time (where some unit cells may have the same dipole pair active as some other unit cells). Depending on the states of the unit cells, the reflectarray can steer a circularly polarized beam. The array can steer the beam at least 60° while maximizing gain, thereby improving link performance.

Figure 19A:
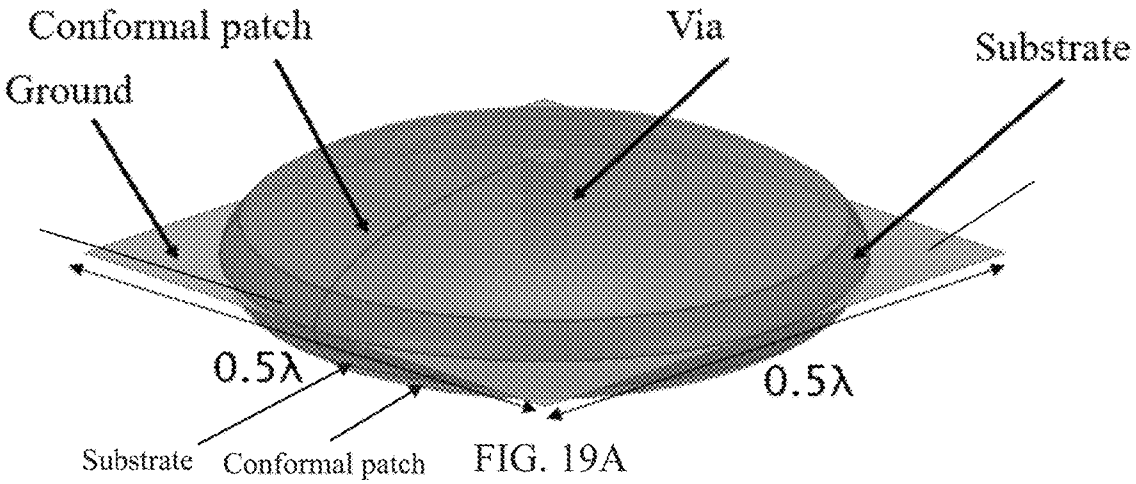
FIG. 19A shows a perspective view of a unit cell of an antenna array, the unit cell having a 3D conformal patch radiating element, according to an embodiment of the subject invention. The unit cell in FIG. 19A is for a transmitarray, and there is a transmitting layer disposed on one surface of the ground plane and a receiving layer disposed on an opposite surface of the ground plane. Each of the transmitting layer and receiving layer can comprise a substrate disposed on the ground plane and a conformal patch disposed on the substrate. Though certain dimensions are shown in FIG. 19A, this is for exemplary purposes and should not be construed as limiting.
Figure 19B:
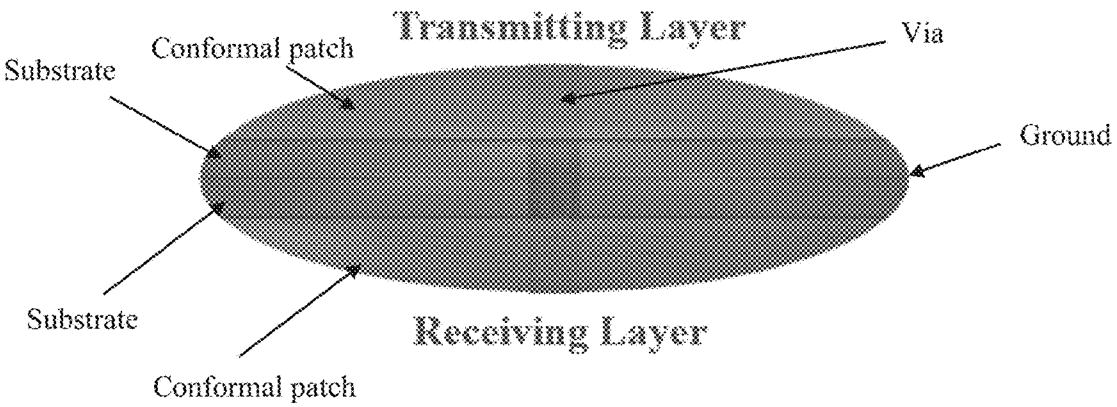
FIG. 19B shows a side view of the unit cell shown in FIG. 19A. Though certain dimensions are shown in FIG. 19B, this is for exemplary purposes and should not be construed as limiting.

In an embodiment, a transmitarray can comprise a 3D conformal radiating element on each surface of the ground plane. FIGS. 19A and 19B show a perspective view and a side view, respectively, of a unit cell of a transmitarray, the unit cell having a 3D conformal patch radiating element, according to an embodiment of the subject invention. Referring to FIGS. 19A and 19B, a transmitting layer can be disposed on a first surface of the ground plane and a receiving layer can be disposed on a second surface of the ground plane opposite to the first surface. Each of the transmitting layer and receiving layer can comprise a substrate disposed on the ground plane and a 3D conformal radiating element (e.g., a 3D conformal patch) disposed on the substrate. The unit cell can include a via going through the substrate of the transmitting layer, the ground plane, and the substrate of the receiving layer, electrically connecting the 3D conformal radiating element of the transmitting layer with the 3D conformal radiating element of the receiving layer. The via can be in direct physical contact with the 3D conformal radiating element of the transmitting layer and/or the 3D conformal radiating element of the receiving layer Embodiments of the subject invention provide antenna arrays that are low cost and easy to fabricate. Unit cells as disclosed herein have not been used in the related art for reflectarrays or transmitarrays. The unit cells of the arrays can achieve high gain and efficiency offering a beamwidth coverage of at least 60°. The arrays can provide enhanced capabilities in existing mobile (e.g., 5G/6G) and satellite communications systems.

The term 3D radiating element (or 3D conformal radiating element), as used herein, requires that the radiating element extends significantly (e.g., a distance that is at least 25% of a diameter or greatest width of the radiating element) above the surface of the ground plane on which it is disposed. That is, while traditional radiating elements (e.g., patch-style, dipole-style, and loop-style radiating elements) may in some cases have some incidental amount of conductive material that extends above the surface of the ground plane, this will be negligible in height compared to the width of the radiating element and, therefore, traditional radiating elements are not included in the term 3D radiating elements.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An antenna array, comprising:

a ground plane; and a plurality of unit cells disposed on the ground plane, each unit cell comprising a three-dimensional (3D) conformal radiating element comprising a conductive material, the 3D conformal radiating element of each unit cell being conformal on a hemispherical shape, the 3D conformal radiating element comprising a central conductive portion and a plurality of dipole arms each connected to the central conductive portion via a switch, such that if the switch connecting a dipole arm to the central conductive portion via a switch is on, that dipole arm is active, and if the switch connecting a dipole arm to the central conductive portion via a switch is off, that dipole arm is not active.

2. The antenna array according to claim 1, the antenna array being a reflectarray or a transmitarray.

3. The antenna array according to claim 1, each unit cell further comprising an electrically insulating substrate disposed on the ground plane and on which the 3D conformal radiating element is disposed.

4. The antenna array according to claim 3, the electrically insulating substrate of each unit cell being in direct physical contact with the ground plane and with the 3D conformal radiating element of the respective unit cell.

5. The antenna array according to claim 1, each unit cell having a maximum height, measured in a direction perpendicular to the ground plane, of 5 millimeters.

6. The antenna array according to claim 1, the antenna array having a beamwidth coverage of at least 60° with a gain beamwidth drop from the broadside of no more than 3 decibels (dB).

7. The antenna array according to claim 1, the antenna array having a reflection phase range of at least 300°.

8. An antenna array, comprising:

a ground plane; and a plurality of unit cells disposed on the ground plane, each unit cell comprising a three-dimensional (3D) conformal radiating element comprising a conductive material, the 3D conformal radiating element of each unit cell being conformal on a hemispherical shape, the antenna array being a reflectarray or a transmitarray, each unit cell further comprising an electrically insulating substrate disposed on the ground plane and on which the 3D conformal radiating element is disposed, the electrically insulating substrate of each unit being in direct physical contact with the ground plane and with the 3D conformal radiating element of the respective unit cell, each unit cell having a maximum height, measured in a direction perpendicular to the ground plane, of 5 millimeters, the antenna array having a beamwidth coverage of at least 60° with a gain beamwidth drop from the broadside of no more than 3 decibels (dB), the antenna array having a reflection phase range of at least 300°, the 3D conformal radiating element comprising a central conductive portion and a plurality of dipole arms each connected to the central conductive portion, and the plurality of dipole arms each connected to the central conductive portion via a switch, such that if the switch connecting a dipole arm to the central conductive portion via a switch is on, that dipole arm is active, and if the switch connecting a dipole arm to the central conductive portion via a switch is off, that dipole arm is not active.

* * * * *